(12) United States Patent
Albertini et al.

(10) Patent No.: US 6,279,973 B1
(45) Date of Patent: *Aug. 28, 2001

(54) ENERGY ABSORPTION APPARATUS

(75) Inventors: Carlo Albertini, Ispra (IT); Mikhail Mogilevski, Novosibirsk (RU)

(73) Assignee: European Community of Rue Alcide de Gasperi (LU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,562

(22) Filed: May 5, 1998

Related U.S. Application Data

(63) Continuation of application No. PCT/EP96/04847, filed on Nov. 6, 1996.

(30) Foreign Application Priority Data

Nov. 6, 1995 (EP) .................................................. 95307927

(51) Int. Cl.$^7$ ................................................. B60R 19/20
(52) U.S. Cl. ........................................... 293/107; 293/134
(58) Field of Search ..................................... 293/107, 110, 293/132, 133, 134; 188/371, 376, 377

(56) References Cited

U.S. PATENT DOCUMENTS

| | | | |
|---|---|---|---|
| 3,284,122 | * 11/1966 | Rich | 293/107 |
| 3,470,763 | 10/1969 | Johnston | |
| 3,503,600 | 3/1970 | Rich | |
| 3,512,822 | * 5/1970 | Rich et al. | 293/107 |
| 3,545,802 | * 12/1970 | Rich | 293/107 |
| 3,588,158 | * 6/1971 | Ford | 293/107 |
| 3,588,159 | 6/1971 | Duckett | |
| 4,574,379 | 4/1971 | Jordan | |
| 5,154,445 | 10/1992 | Weller | |
| 5,301,990 | 4/1994 | Willeford | |
| 5,445,430 | * 8/1995 | Nichols | 296/153 |

FOREIGN PATENT DOCUMENTS

| | | |
|---|---|---|
| 40 37 101 | 6/1991 | (DE) . |
| 41 18 300 | 12/1992 | (DE) . |
| 58-180845 | 10/1983 | (JP) . |
| 89/12778 | 12/1989 | (WO) . |

OTHER PUBLICATIONS

Machine Design, vol. 39, No. 11, May 11, 1967, Cleveland, US, p. 64.

Eleiche, et al., "Survey of Energy Absorbing Devices Used in Engineering Systems", in Scientific Engineering Bulletin, Faculty of Engineering, Cairo University, Egypt, 1981, pp. 1–42.

Johnson, et al., "Metallic Energy Dissipating Systems", Applied Mechanics Reviews, University Engineering Department, University of Cambridge, vol. 31, No. 3, Mar. 1978, pp. 277–288.

* cited by examiner

Primary Examiner—D. Glenn Dayoan
Assistant Examiner—Jason Morrow
(74) Attorney, Agent, or Firm—Pillsbury Winthrop LLP

(57) ABSTRACT

A vehicle shows a vehicle bumper (9) having a first member (10) and a second member (11) connected to a vehicle. Low viscosity liquid (12) is trapped in between members (10 and 11) and on impact of member (10) with an obstacle a frangible membrane (13) can burst causing a high velocity liquid jet to be expelled through channel (11a) thus dissipating the impact energy.

17 Claims, 1 Drawing Sheet

US 6,279,973 B1

ENERGY ABSORPTION APPARATUS

This application is a Continuation of PCT/EP96/04847 filed Nov. 6, 1996.

BACKGROUND OF THE INVENTION

1. Field of the Invention

This invention relates to energy absorption apparatus more particularly for the absorption or dissipation of kinetic energy during an impact or crash for example of a motor vehicle colliding with an obstruction.

2. Description of the Related Art

Various systems have been proposed for the protection of drivers and passengers in vehicles during a crash. Popular methods involve, for example, compressed air bags, hydraulic dampers, deformable fibre reinforced or metal constructions such as tubes, profiles or honeycomb shapes. However, it is believed that there tend to be disadvantages with all known systems. For example, specific energy absorption of existing systems is usually not high enough, more especially in the case of non-axial impacts, and the only way to increase the level of safety at high velocities with such systems would appear to be to enlarge to a very great extent the dimensions and masses involved of the energy absorbing devices. Accordingly, by way of background information attention is drawn to the following references:

Scientific Eng.Bull., Cairo Univ., Egypt,v.1981/1, A.M. Eleiche, A. F. Bastawros, Survey of energy devices used in engineering systems; Appl.Mech.Reviews, 1978,v.31, N 3, 277, W. Johnson, S. R. Reid, Metallic energy dissipating systems.

SUMMARY OF THE INVENTION

It is an object of the present invention to alleviate the aforementioned, or other, problem in absorbing impact energy or to provide energy absorption apparatus which is improved in at least some respect.

According to one aspect of the present invention there is provided an energy absorption apparatus, for absorbing energy on impact with an obstacle, said apparatus comprising a liquid held between a first member and a second member connected or connectable to a moving body, for example a vehicle, in use, the first member being movable or deformable relative to said second member on impact of said first member with an obstacle, thereby exerting a force on said liquid causing a frangible membrane or portion in or adjacent to the first or second member to burst and a jet of said liquid to be expelled through said burst membrane or portion.

Usually the liquid will have a low viscosity coefficient, of the order of 1 puas or $10^{-3}$ kg/m.s at 20° C., which may be provided by a liquid such as water. Preferably, the velocity of the jet is about 200 to 300 m/s when the moving body to be decelerated has a velocity in the order of 10 to 20 m/s. The frangible membrane preferably has a diameter in the order of 10 mm or in the range of about 5 mm to 20 mm.

In one embodiment of this aspect of the present invention the first member may comprise a piston and the second member may comprise a cylinder containing the liquid; the second member may be provided with a hole or opening across which the frangible membrane extends or the second member may be provided with a reduced thickness portion forming said frangible membrane. The frangible membrane will usually be of circular shape.

It is possible that a plurality of frangible membranes or portions will be provided in order to provide a plurality of jets of said liquid which are expelled from said second member or cylinder in use to absorb impact energy.

A preferred form of the energy absorption apparatus in accordance with the present invention is a cylinder containing a liquid, with a movable piston and a hole or holes for the formation of jets. A preferable relation or ratio of the piston section to the jet section is about 15–20. Then at a piston velocity (which is equal to the instant velocity of the moving body) in the range of 10–20 m/s the jet velocity can reach or even exceed 200–300 m/s. An estimate based on the energy conservation law indicates that it is possible to stop a vehicle with an initial velocity of 50–70 km/hour using two cylinders (to provide higher safety at non-central collision) with the total volume of the liquid about or less than 10 liters.

According to a further aspect of the present invention there is provided energy absorption apparatus, for absorbing energy on impact with an obstacle, said apparatus comprising a liquid encased in a shell, the shell being deformable on impact with an obstacle thereby exerting a force on said liquid causing a frangible membrane or portion in the shell to burst and a jet of said liquid to be expelled through said burst membrane or portion.

Usually, the shell will be integrally formed and may be, for example, a part of a bumper.

Further according to the present invention there is provided an energy absorption apparatus for absorbing energy on impact with an obstacle, said energy absorption apparatus being for transforming the kinetic energy of the impact into kinetic energy of a high velocity liquid jet, said liquid being of low viscosity.

Still further according to the present invention there is provided an energy absorption apparatus, for absorbing energy on impact with an obstacle, said apparatus comprising one or more volumes of liquid arranged between a first member and a second member connected or connectable to a moving body or encased in a shell, the first member being movable or deformable relative to said second member on impact of said first member with an obstacle, or the shell being deformable on impact with an obstacle, thereby exerting a force on said liquid and causing at least one jet of liquid to be formed to dissipate the kinetic energy of the impact, said jet possibly being formed by a frangible membrane bursting or possibly being formed through a valve or other pressure relief means.

Further according to the present invention there is provided a method of absorbing energy on impact of energy absorbing apparatus with an obstacle, said method comprising moving or deforming a first member relative to a second member connected to a moving body thereby exerting a force on a liquid held between the first and second members causing a frangible membrane or portion in or adjacent to the first or second member to burst, or actuating pressure relief means, and forming a jet of said liquid expelled through said burst membrane or portion or pressure relief means.

Further according to the present invention there is provided a method of absorbing energy on impact of energy absorbing apparatus with an obstacle, said method comprising deforming a shell containing a liquid on impact with an obstacle, thereby exerting a force on said liquid causing a frangible membrane or portion in the shell to burst or actuating pressure relief means to form a jet of said liquid expelled through said burst membrane or portion or pressure relief means.

Many advantageous apparatus and method features of the present invention will be apparent from following the description and drawings.

BRIEF DESCRIPTION OF THE DRAWINGS

Embodiments of the energy absorption apparatus and the method for absorbing energy according to the present invention will now be described by way of example only, with reference to the accompanying much simplified diagrammatic drawings, in which.

DETAILED DESCRIPTION OF THE INVENTION

Figure 1:
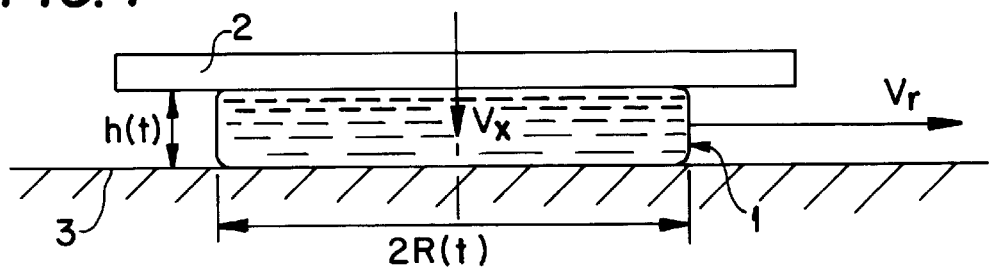
FIG. 1 shows a first proposal for absorption or dissipation of impact energy.

FIG. 1 of the drawings shows a cylinder 1 of a generally incompressible, nonviscous liquid which is arranged between two parallel rigid plates 2 and 3. The plates collide with a velocity $V_x$ and this is represented in FIG. 1 by the lower plate being fixed and the upper one moving with the velocity $V_x$. The radial velocity $V_r$ of the outer surface of the liquid cylinder 1 can be found from the condition of incompressibility:

$$\pi R_o^2 h_o = \pi R^2(t) h(t) \qquad 1)$$

$R_o$ = the radius of the cylinder 1 at time zero or prior to impact.

$h_o$ = the height of the cylinder 1 at time zero or prior to impact.

t = time.

Thus, differentiation of equation 1) yields:

$$\frac{d\{R^2(t)h(t)\}}{dt} = 0$$

$$\therefore \frac{d\{R^2(t)\}}{dt} \cdot h(t) + R^2(t) \cdot \frac{dh(t)}{dt} = 0$$

$$\therefore 2R(t)\frac{dR(t)}{dt} \cdot h(t) + R^2(t) \cdot \frac{dh(t)}{dt} = 0$$

substituting the value of the instantaneous velocity of the upper plate:

$$V_x(t) = \frac{dh(t)}{dt}$$

and the velocity of the external radius of the cylinder 1:

$$V_r(R, t) = \frac{dR(t)}{dt}$$

into equation 1)

yields:

$$2R(t).V_r(R,t)h(t) + R^2(t).V_x(t) = 0$$

rearranging gives:

$$\frac{V_r(R, t)}{V_x(t)} = \frac{R(t)}{2h(t)}$$

substituting for h(t) in equation 1) yields:

$$\frac{V_r(R, t)}{V_x(t)} = \frac{R(t)}{2h(t)} = \frac{R^3(t)}{2h_o R_o^2} = \frac{1}{2}\left[\frac{R_o}{h_o}\right]\left[\frac{R(t)}{R_o}\right]^3$$

At the appropriate choice of the parameters the radial velocity can essentially exceed the axial velocity, or the impact velocity if a plate is a colliding part of construction (for example a deformable wall or a road barrier). When h(t) tends to zero the radial velocity $V_r(R,t)$ tends to infinity. Thus the ratio $V_r/V_x$ is very sensitive to the relative value of the initial height of the cylinder $h_o$.

The radial velocity of different particles of the cylinder will depend linearly on the radius.

The mean square of radial velocity is required for an estimation of the kinetic energy of a system.

The mean square of radial velocity $\overline{V_r^2}$ averaged out over the volume (this value characterises the kinetic energy $\frac{1}{2} mV_r^2$ taken from the translational movement of the body) can be found from the relation:

$$\frac{\overline{V_r^2(t)}}{V_x^2(t)} = \frac{1}{16}\left[\frac{R_o}{h_o}\right]^2 \times \left[\frac{R}{R_o}\right]^6$$

Figure 3:
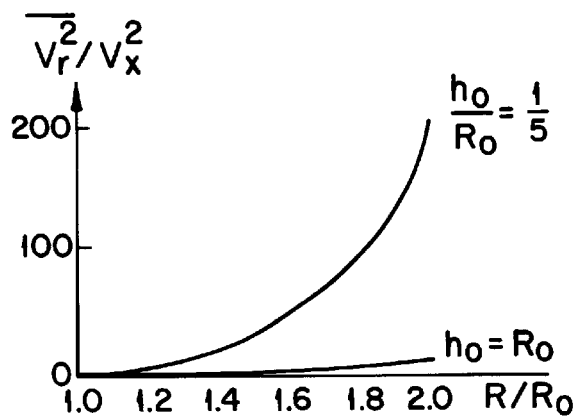
FIG. 3 shows graphically the sensitivity of a transformation of kinetic energy of translational movement of a body into kinetic energy of a liquid flux.

This dependency is shown in FIG. 3, which shows that the transformation of kinetic energy of translational movement of a body in the kinetic energy of a liquid flux is very sensitive to the initial relative height of a cylinder (compare curves for two different values of initial height of cylinder $$\frac{h_o}{R_o} = \frac{1}{5} \text{ and } h_o = R_o\bigg).$$

The energy conservation law for the impact phenomenon is $$\frac{MV_o^2}{2} = \frac{MV_x^2(t)}{2} + \frac{m\overline{V_x^2(t)}}{2} + \frac{mV_x^2(t)}{2} + Q$$

where M=the mass of a moving body e.g. upper plate 2, $V_o$ and $V_x(t)$=the initial velocity and velocity at the moment t of the moving body, m=the mass of a liquid, $\overline{V_r^2}(t)$=the mean square of the radial velocity, Q=the energy loss due to the viscosity. Neglecting by two latest members of the equation we will receive a relative change of the velocity of the body in a result of the jet formation as follows:

$$\frac{V_o}{V_x} = \sqrt{1 + \frac{m}{16M}\left[\frac{R_o}{h_o}\right]^2\left[\frac{h_o}{h}\right]^3}$$

m=mass of liquid cylinder 1

M=mass of upper plate 2

Estimates of expected effects of energy absorption can be made for different sets of significant parameters for a crash impact of a vehicle of a certain weight e.g. 1000 kg.

Using the above principle the kinetic energy of a moving body can be transformed into the kinetic energy of a high velocity liquid jet from a specially attached device.

Figure 2:
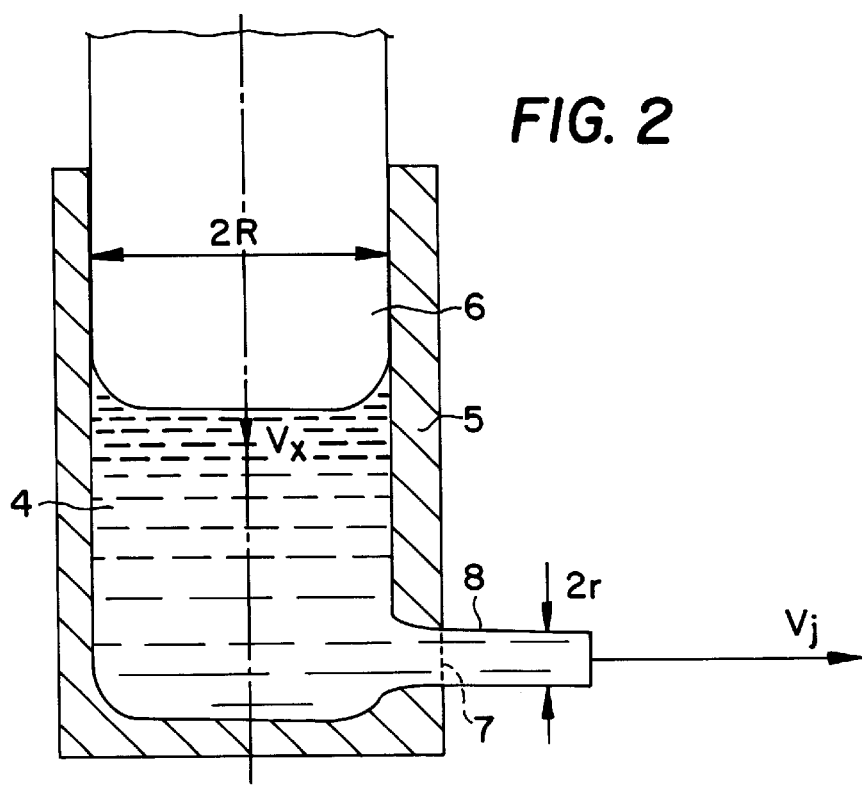
FIG. 2 shows a second proposal for the absorption or dissipation of impact energy.

Thus, the idea expressed in FIG. 1 can be further developed by the arrangement shown in FIG. 2 which modifies the principal idea expressed in FIG. 1. FIG. 2 shows a cylinder of liquid 4 in a vessel 5 with a piston 6 and a jet outlet 7 through which a jet of liquid 8 can issue under certain conditions. The ratio of cylinder height to radius R as shown may be advantageous and the ratio of R/r as shown may also be advantageous.

When the velocity of the piston 6 is $V_x$ the velocity of a jet Vj due to the condition of incompressibility is $$Vj = V_x \frac{S}{J} = V_x \times \frac{R^2}{r^2}$$

S=surface area of section of water cylinder
J=surface area of section of jet stream It is straightforward to select an appropriate choice of relation between the radius of cylinder R and the radius of jet r, in the case of velocity of piston 6, representing part of the moving system which has to be decelerated, of the order of 10 to 20 meters per second (or 36–72 km per hour) to achieve a velocity of the jet exceeding 200 to 300 meters per second.

Figure 4:
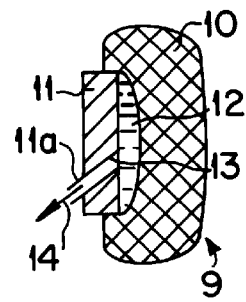
FIG. 4 shows a cross-section through a vehicle bumper in accordance with the present invention.

FIG. 4 shows a possible arrangement for energy absorption apparatus in the form of a bumper 9, (for absorbing energy on impact of a vehicle fitted with a bumper) with an obstacle (not shown). The bumper 9 may consist of a first member 10 and a second member 11 connected to the vehicle (not shown), in use. The bumper 9 includes a liquid 12 trapped in between the two members 10 and 11 and a frangible membrane 13 is provided on the member 11 at an inlet to channel 11a in member 11 provided for jet formation. The liquid 12 is in direct contact with one side of the membrane 11a and, on impact of member 11 with an obstacle, movement and/or deformation of member 10 relative to member 11 will cause the frangible membrane 13 to burst and a jet 14 to be formed which is expelled through channel 11a in order to dissipate the impact energy.

To minimise the viscous effects of the liquid 12, which effects can impede jet formation, in practice liquids with a low viscosity coefficient are required which produce liquid fluxes with sufficiently low velocity gradients. Thus, the present invention is concerned with liquids that permit deceleration of the moving body by means of transformation of the kinetic energy on impact into kinetic energy of one or more liquid jets orientated in safe directions, which energy will be absorbed afterwards in a safe manner (for example pulverisation or interaction with the ground and so on). There are two ways to decrease the influence of viscosity. Firstly, it would be reasonable to use a liquid with a small value of viscosity coefficient but this choice is restricted. Reference values of viscosity coefficient are water—1 puas, or $10^{-3}$ kg per meter per second at 20° C., 1.79 puas at 0° C., 0.53 puas at 50° C. or ethyl ether 0.28 puas at 0° C. or 0.23 puas at 20° C. or benzine 0.65 puas at 20° C. However, the use of ether and benzine in crash impacts is not realisable because of their flammability characteristics. Preferable liquids are some low-viscous and low-melting spirit solutions of water, or an antifreeze, or an estinguisher. A second practical way to decrease viscous effects is to use sufficiently small gradients, or sufficiently large geometric parameters of the flux; the minimal limit thickness of a flux may be restricted by a value of about 5 mm.

The minimum size of hole required for jet formation or discharge is determined by the energy loss due to viscosity and practically may be several millimeters. A hole which is too big would become non-effective because of a jet velocity which is too small. In the scheme as related with reference to FIG. 1 the higher the relation R/h, the greater jet velocity. However, in practice a jet formation which is too low in the case of low water cylinders (less than several mm) will be impeded by viscosity. The choice of direction of the jet or jets in any particular case will be determined mainly by the condition of safety because a high velocity jet can destroy a weak obstacle. Quite simply, any viscous effects must not suppress the possibility of jet formation and the viscous loss in the relation for the energy conservation law (which is used for the estimate of the required mass of a liquid) can be neglected, i.e. should not exceed about 10%. With viscous effect two high (small holes, severe velocity gradients) the process of jet formation would be suppressed.

A plurality of liquid volumes (e.g. three), each producing a plurality of jets would appear advantageous more particularly in the construction of vehicle bumpers.

It is to be understood that the scope of the present invention is not to be unduly limited by the particular choice of terminology and that a specific term may be replaced or supplemented by any equivalent or generic term. For example, the term "frangible membrane" may be replaced by "pressure relief means" or the term "shell" may be replaced by "receptacle" or "container". Further it is to be understood that individual features, method or functions related to the energy absorption apparatus, theory thereof, or parts thereof alone or in combination with e.g. a vehicle might be individually patentably inventive. The singular may include the plural or vice versa. In particular, any disclosure in this specification of a range for a variable or parameter shall be taken to include a disclosure of any selectable or derivable subrange within that range and shall be taken to include a disclosure of any value for the variable or parameter found within or at an end of the range.

An important feature of the energy absorbing apparatus is the use of a liquid jet formation at high speed V about 10–20 times the speed of the impacting object; therefore the impact energy absorption is much more effective because it depends on the square of the speed ($V^2$).

A low viscosity liquid is used because it is needed for obtaining a high speed jet and precise geometric relationships between impacted liquid surface and diameter of the liquid jet output hole.

Other proposals for energy absorption cannot generate a liquid jet of high speed (V) because they use viscous and high viscous liquids and do not take care of the geometric relationships need to build up a high velocity jet.

Other proposals mainly use the viscosity of the liquid in order to absorb energy; therefore the energy absorption mechanism is much less efficient because viscosity depends linearly on the liquid speed.

A previous proposal (reference Patents Abstracts of Japan Vol. 008 No. 022(M-272) shows an energy discharging buffer where an insert enters a volume with liquid or greasy material. Here, the mechanism of energy absorption is the viscous friction, which is much less effective than formation of high velocity jets in our proposal. Friction force will increase linearly with displacement in this previous proposal. Said previous proposal tends to be disadvantageous because of large dimensions and nonstability in the case of a little oblique collision. In the present invention no such restrictions apply.

Regarding another proposal (reference Machine Design Vol. 39, No. 11, May 11, 1967, page 64) the present invention has:
(a) essential difference in ideology and in principal constructive features. Namely we make a stress on jet formation which at high velocity of a flux can transform kinetic energy of a moving body into kinetic energy of a liquid jet (referral to claims 1,3,12,17,18 for jet formation and claims 14,15 and 17 for transformation of energy).

(2) Subdivision of a liquid volume in a previous scheme with the help of baffles is typical for constructions directed on the energy absorption through the viscous mechanism mainly. But high viscous effects decrease the velocity of a flux, do not permit to form effective energy absorbing jet. In a limit case of the very high viscosity, total energy absorption falls and the stiffness of an impact will increase with a tendency to an elastic reflection which will be very dangerous for the safety of passengers.

(3) Characteristic volumes of water (4–7 gal. for passenger cars and up to 15 gal. for commercial vehicles) are essentially higher than our estimates for energy transformation through the jet formation mechanism. This means the prior proposal would practically not be usable in a modern vehicle where the weight reduction is a must. Furthermore, the important weight of liquid absorption is based on the viscosity effect and not on high velocity jet formation. In fact we could reduce the mass of liquid because of the high velocity of jet V and the dependence on the square of velocity of the jet formation energy absorption mechanism.

In another proposal (DE 4037101 A1) the liquid inside the structural members is used to render more effective the folding mechanisms of the structural members in which the liquid is inserted inside. Here the mechanism used to absorb energy is the deformation of the structural members and some viscosity effects which only achieves very low efficiency in energy absorption.

What is claimed is:

1. An energy absorption apparatus for absorbing energy on impact with an obstacle, the apparatus comprising:
   a first member;
   a second member, the first and second members being arranged to hold liquid therebetween, the second member being connectable to a moving body; and
   a frangible portion, wherein the first member is movable relative to the second member on impact of the first member with an obstacle to thereby exert a force on the liquid and to cause the frangible portion to burst and a jet of the liquid to be expelled through the frangible portion, and
   wherein said apparatus is constructed and arranged so that the jet has a velocity at least ten times the velocity of the movement of the first member relative to the second member on a said impact.

2. An apparatus as claimed in claim 1 wherein the liquid has a viscosity coefficient less than or equal to 1 puas at 20° C.

3. An apparatus as claimed in claim 1 wherein the velocity of the jet is about 200 to 300 m/s when the moving body has a velocity in the order of 10 to 20 m/s.

4. An apparatus as claimed in claim 1 wherein the frangible portion has a diameter in the range of about 2 mm to 12 mm.

5. An apparatus as claimed in claim 1 wherein the second member has an opening across which the frangible portion extends.

6. An apparatus as claimed in claim 1 wherein the frangible portion is of a circular shape.

7. An apparatus as claimed in claim 1 further comprising at least one additional frangible portion in order to provide a plurality of jets of the liquid expelled from the second member to absorb impact energy.

8. An energy absorption apparatus for absorbing energy on impact with an obstacle, the apparatus being connectable to a moving body and comprising:
   a piston;
   a cylinder, the piston and the cylinder being arranged to hold liquid therebetween; and
   pressure relief means, wherein the piston is movable relative to the cylinder to exert a force on the liquid to cause the pressure relief means to allow a jet of the liquid to be expelled therethrough, the jet having a velocity at least ten times the velocity of the movement of the piston relative to the cylinder.

9. An apparatus as claimed in claim 8 in which the relation or ratio of piston section to jet section is about 15–20.

10. An apparatus as claimed in claim 8 having two cyclinders and a total liquid volume of about ten liters.

11. An energy absorption apparatus for absorbing energy on impact with an obstacle, said apparatus comprising a shell encasing liquid therein, the shell being deformable on impact with an obstacle to thereby exert a force on the liquid and cause a frangible portion in the shell to burst and a jet of the liquid to be expelled through the frangible portion, wherein said apparatus is constructed and arranged so that the jet has a velocity at least ten times the velocity of the deformation of the shell on a said impact.

12. An apparatus according to claim 11 wherein the liquid has a viscosity coefficient less than or equal to 1 puas at 20° C. and is suitable for formation of a high velocity jet through the frangible portion.

13. An energy absorption apparatus for absorbing energy on impact with an obstacle, the apparatus comprising one or more volumes of liquid arranged between a first member and a second member connectable to a moving body or encased in a shell, the first member being movable relative to said second member on impact of said first member with an obstacle, or the shell being deformable on impact with an obstacle, to thereby exert a force on the liquid and to cause at least one jet of liquid to be formed to dissipate the kinetic energy of the impact, wherein said apparatus is constructed and arranged so that the jet has a velocity at least ten times the velocity of one of (A) the movement of the first member relative to the second member and (B) the velocity of the deformation of the shell on a said impact.

14. A method of absorbing energy on impact of an energy absorbing apparatus with an obstacle, the method comprising moving a first member relative to a second member connected to a moving body thereby exerting a force on liquid held between the first member and the second member, causing a frangible portion to burst, and forming a jet of the liquid which is expelled through the frangible portion, wherein the jet has a velocity at least ten times the velocity of the movement of the first member relative to the second member on a said impact.

15. An apparatus as claimed in claim 1 wherein the second member is provided with a reduced thickness portion forming the frangible portion.

16. An apparatus according to claim 11 wherein the shell is an integrally formed member.

17. A method of absorbing energy on impact of energy absorbing apparatus with an obstacle comprising the step of deforming a shell containing liquid on impact with an obstacle, thereby exerting a force on said liquid causing a frangible portion in the shell to burst to form a jet of said liquid which is expelled through the frangible portion, wherein the jet has a velocity at least ten times the velocity of the deformation of the shell on a said impact.

* * * * *